(12) United States Patent
Lowe et al.

(10) Patent No.: US 7,353,454 B2
(45) Date of Patent: Apr. 1, 2008

(54) WEB BASED DEVICE MANAGEMENT AND MONITORING INTERFACE

(75) Inventors: Leteshia A. Lowe, Tucson, AZ (US); Jeffrey S. Perry, Tucson, AZ (US); Jeffrey W. Pilch, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 10/851,588

(22) Filed: May 21, 2004

(65) Prior Publication Data

US 2005/0262231 A1 Nov. 24, 2005

(51) Int. Cl.
*G06F 15/173* (2006.01)
(52) U.S. Cl. ........................ 715/740; 715/736
(58) Field of Classification Search ................ 715/760, 715/738, 764, 733, 513; 709/220; 707/102, 707/101
See application file for complete search history.

(56) References Cited

U.S. PATENT DOCUMENTS

| 6,253,228 | B1 * | 6/2001 | Ferris et al. ................ 709/203 |
| 6,393,427 | B1 | 5/2002 | Vu et al. |
| 2002/0075297 | A1 | 6/2002 | Boulter |
| 2003/0084059 | A1 | 5/2003 | Kelley et al. |
| 2003/0101255 | A1 * | 5/2003 | Green ........................ 709/223 |
| 2003/0103090 | A1 | 6/2003 | Kelley et al. |
| 2003/0218633 | A1 | 11/2003 | Mikkhail et al. |
| 2003/0220989 | A1 | 11/2003 | Tsuji et al. |
| 2003/0233430 | A1 | 12/2003 | Hill, Jr. et al. |

* cited by examiner

*Primary Examiner*—Doug Hutton
*Assistant Examiner*—Daeho D Song
(74) *Attorney, Agent, or Firm*—Law Office of Charles W. Peterson, Jr.; John C. Kennel, Esq.

(57) ABSTRACT

A web-based management interface, program product for displaying system configuration information and method of providing system or subsystem configuration information, e.g., for a storage subsystem. A web displayable file, e.g., hypertext mark up language (HTML), is generated and updated to reflect current configuration data for a storage subsystem configuration. The web page, when displayed, includes a generation snapshot that is compared against a current generation indicator that is associated with a current HTML file. If they match, the displayed web page is current; otherwise, an updated HTML file is downloaded and displayed.

20 Claims, 3 Drawing Sheets

__US 7,353,454 B2__

WEB BASED DEVICE MANAGEMENT AND MONITORING INTERFACE

BACKGROUND OF THE INVENTION

1. Field of the Invention

The present invention is related to web-based management interfaces and more particularly to a web-based management interfaces for managing and monitoring complex systems such as data storage subsystems.

2. Background Description

Increasingly, network based devices include a web-based management interface for managing system resources, device configuration and for distributing system information, e.g., status. Since system status and configuration may be changing, constantly, a typical such web interface application is designed to dynamically build and rebuild individual web pages with every change. A typical interface may link to a number of web pages, built from a collection of hypertext mark up language (HTML) files with placeholders in markup text for receiving and displaying dynamic input data. Variable data, including configuration information, may be generated, collected and provided to an executable code module that, upon selection of the page link, combines the data with the HTML template files to produce complete HTML documents. The HTML documents are transferred to web-based clients using standard hypertext transport protocol (http) and displayed as web pages.

In a tape library, for example, the interface must update linked web pages to reflect device configuration changes as they occur. Typically, the tape library interface includes a number of HTML source code files, at least one for each of the various states of the navigation display. Whenever device configuration changes, a respective navigation source file is regenerated to reflect the new configuration. To maintain synchronization, a fresh copy of the navigation frame must be sent each time a client selects a link from the top navigation level.

Unfortunately, this presents a number of synchronization problems. For example, several separate source files must be maintained, each describing different web interface navigation aspects. Furthermore, these source files must be kept up-to-date and synchronized with each another. So, a change in one source file must be carried across to all of the others. A transcription error may occur as the change is copied and so, the opportunity for transcription errors increases with the number of source files. Also, since a fresh copy of each navigation page is sent with each transaction, even when the configuration remains unchanged, network traffic increases and refreshing the pages may bog down. More importantly, configuration changes are not presented unless and until the user selects a different top level item (than a currently view item) in the web interface navigation frame; otherwise, the web interface does not reload the navigation frame and so, the user may be informed late of system configuration changes or, worse still, the user may miss system configuration changes altogether. For example, system changes may make a first top level item unavailable and, correspondingly, links to that top level item and related information may have been removed from other top level item web pages. However, someone viewing configuration information on that other top level item may continue selecting links to sub-items even to the unavailable top-level, unaware that the information provided by those links is stale; updated configuration information is not presented until another top-level item is selected. So after each configuration change, unless and until a top level item is selected, users may be completely unaware of changes because the navigation frame only reloads when a new top-level navigation item is selected.

Thus, there is a need to keep current and up-to-date information in web-based system management and monitoring interfaces.

SUMMARY OF THE INVENTION

It is a purpose of the invention to provide current configuration information in web-based system management and monitoring interfaces;

It is another purpose of the invention to automatically update configuration information presented in web-based system management and monitoring interfaces;

It is yet another purpose of the invention to reduce network traffic from using web-based system management and monitoring interfaces;

It is yet another purpose of the invention to reduce transcription errors in source files forming web-based system management and monitoring interfaces;

It is yet another purpose of the invention to automatically update configuration information for providing current configuration information in web-based system management and monitoring interfaces without substantially impacting network traffic and, while minimizing source file transcription errors.

The present invention relates to a web-based management interface, program product for displaying system configuration information and method of providing system or subsystem configuration information, e.g., for a storage subsystem. A web displayable file, e.g., a hypertext mark up language (HTML) document, is generated and updated to reflect current configuration data for a storage subsystem configuration. The web page, when displayed, includes a generation snapshot that is compared against a current generation indicator that is associated with a current HTML file. If they match, the displayed web page is current; otherwise, an updated HTML file is downloaded and displayed.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
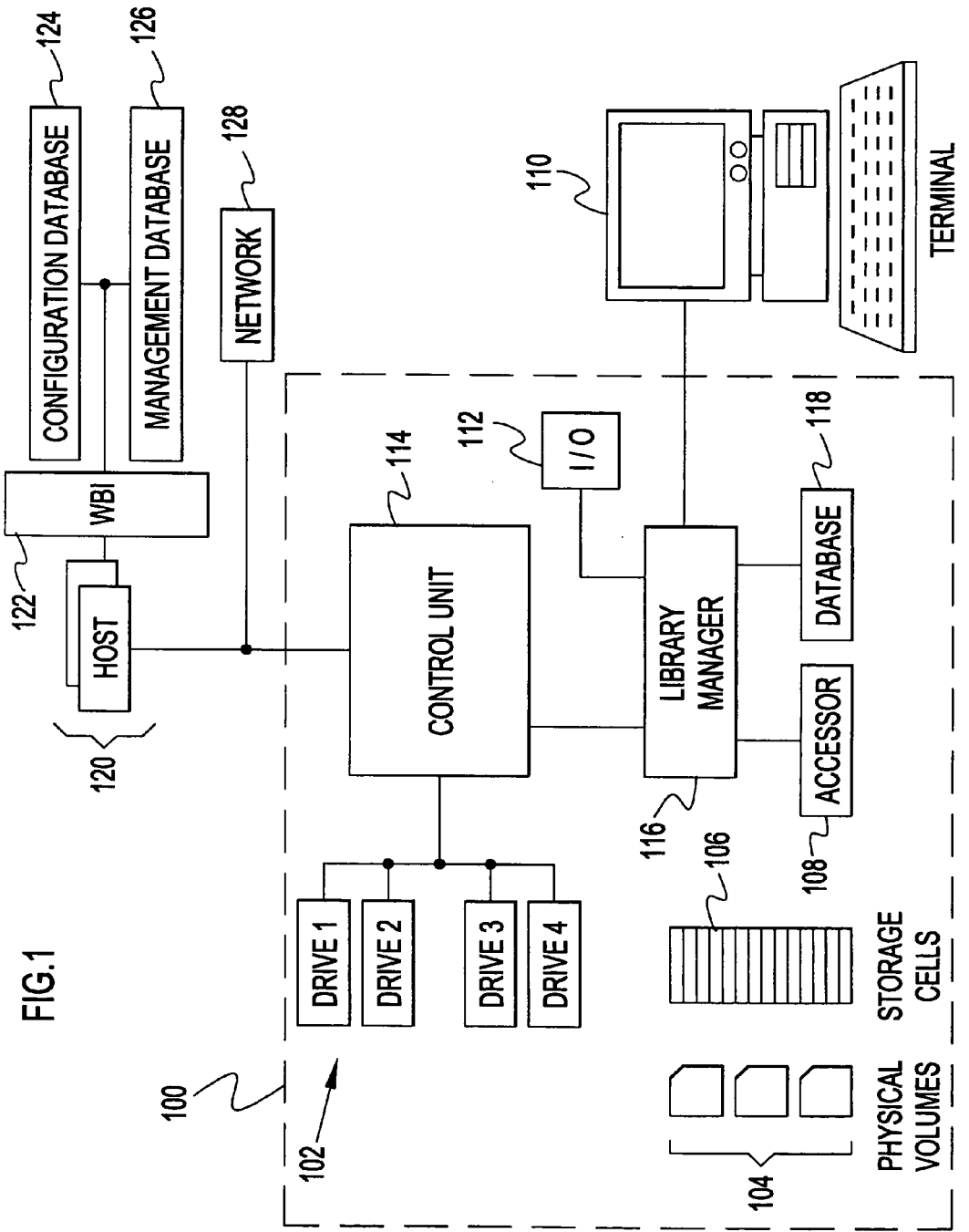
FIG. 1 shows an example of a preferred data storage subsystem with a web-based monitoring and management interface according to the present invention.

FIG. 1 shows an example of a preferred data storage subsystem 100 with a web-based monitoring and management interface according to the present invention, in this example an automated storage media (e.g., tape cartridges) and retrieval library for storing and accessing storage media. A web-based monitoring and management interface according to the present invention resides within a hypertext mark up language (HTML) based application with a navigation frame, e.g., on the left-hand side of the display, to provide a hierarchically-organized navigation through system configuration information. For simplicity of description and for example only, application of the present invention is described with reference to a tape cartridge storage subsystem, such as for example, for the IBM Corporation's TotalStorage™ Enterprise Tape Library 3494. Storage media in a preferred storage subsystem may be magnetic storage media such as magnetic tape, magnetic disk, optical storage such as compact disk (CD) or digital versatile disk (DVD), or any suitable equivalent non-volatile or volatile storage media. Further, the present invention has application to any suitable system or subsystem with a web-based interface or web-based monitoring and management interface.

The data storage subsystem 100 of this example includes one or more drive units 102 for reading and/or writing data on the physical volumes. Physical volumes or media cartridges 104 may be stored in storage cells in a bulk input or bulk storage rack 106. Typically, a single physical volume 104 can be individually addressed and accessed by a volume serial number (volser). An accessor 108 transports a selected physical volume 104 between a storage cell in bulk input rack 106 and a drive 102. System operation may be controlled locally by access through an operator console 110, for example, provided with the subsystem 100 for manual (operator) input (e.g., by an operator configuring with the library) or remotely using a personal computer (PC), for example. A convenience input/output (I/O) station 112 may also be included for introducing media into the subsystem. As noted hereinabove and depending upon the particular storage media, the drives 102 can be optical disk drives or magnetic disk or tape drives. Correspondingly, the physical volumes 104 can be cartridges or cassettes containing optical or magnetic media (e.g., magnetic tape) or any other suitable removable media and associated drives.

A control unit 114 controls drive related actions including drive load/unload and passes host requests to a library manager (LM) 116. Preferably, the control unit 114 and library manager 116 are in software or firmware, e.g., in microcode stored in read only memory (ROM), running on a typical general purpose processor or processors, microprocessor(s) or embedded processor(s). Also, an operator can communicate through operator console 110 with the library manager 116. The library manager 116 controls the accessor 108 in inserting/retrieving each selected physical volume 104 to/from its storage cell based on accessor control tables and programs stored in a library manager database 118. In addition to accessor control tables and programs, the library manager database 118 includes a table that locates the physical volumes 104 in the storage cells.

One or more host systems 120 send requests through the control unit 114 to the library manager 116. A preferred embodiment web-based monitoring and management interface 122 interfaces with a data storage system administration program managing a tape configuration database 124 and a tape management systems database 126. Preferably, the web-based monitoring and management interface 122, tape configuration database 124 and a tape management systems database 126 are components of the library manger 116; and in particular, a single database functions as the library manager database 118, tape configuration database 124 and the tape management system database 126. Subsystem configuration may be accessed using any suitable web capable device, such as a PC running a typical web browser, e.g., Internet Explorer from Microsoft Corporation, Netscape Navigator from Netscape Communications Corporation, Opera from Opera Software ASA, Mozilla from Mozilla.org and the like. Also, typically, the host systems 120 connect over a network 128 to other networked devices (not shown). The data storage system administration program uses the tape configuration database 124 to manage the volumes associated with each data storage subsystem 100 coupled to the particular host 120. The data storage system administration program uses the tape management system database 126 to manage data sets residing on the volumes, including the expiration, owner, access, etc. In addition, the tape configuration database includes a system volume catalog of other data relating to the volumes. Primarily, information contained within the tape configuration database 124 and the tape management system database 126 are displayed by the preferred web-based monitoring and management interface 122.

Figure 2:
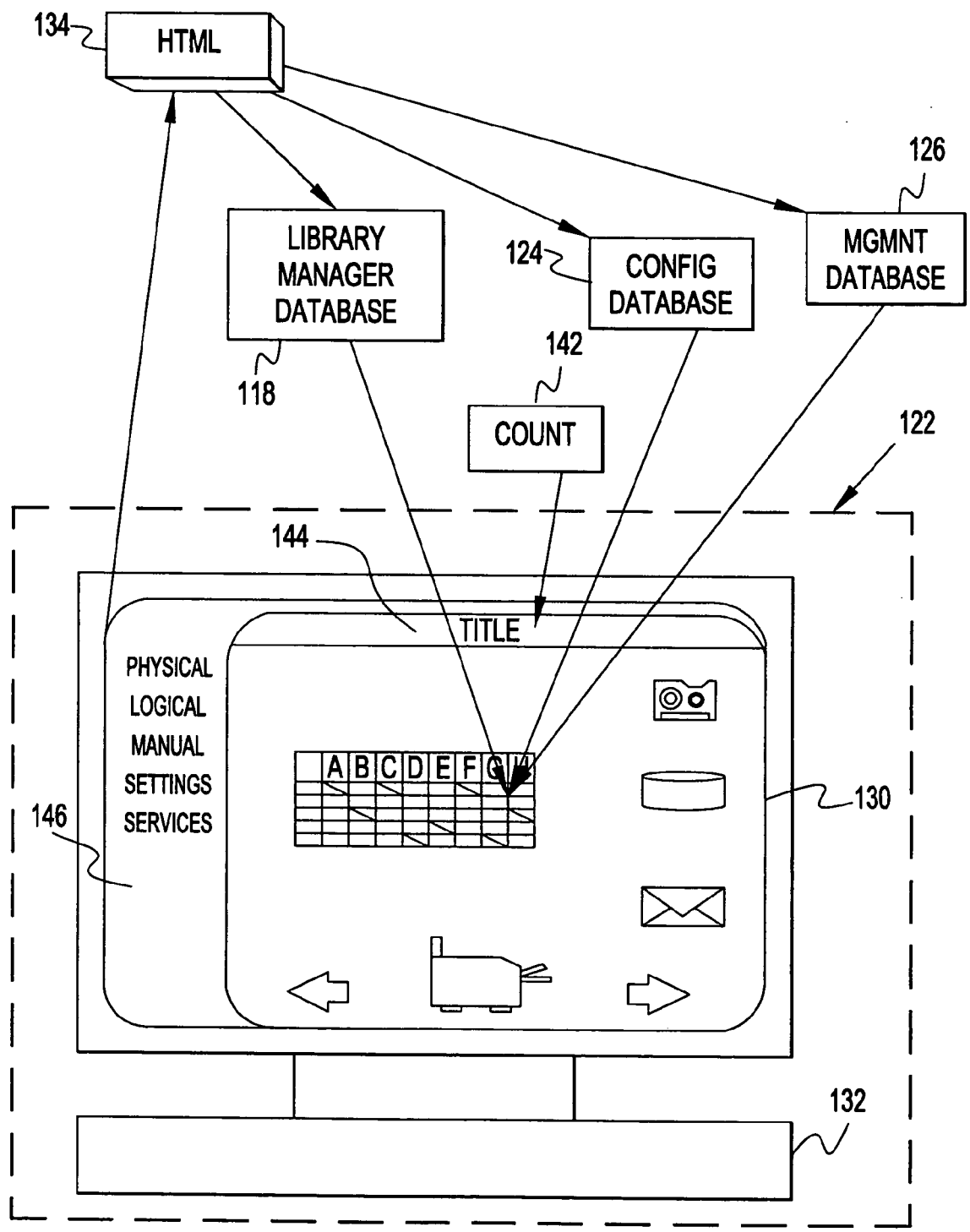
FIG. 2 shows an example of a preferred web-based monitoring and management interface.

FIG. 2 shows an example of a preferred web-based monitoring and management interface 122 that automatically displays an updated configuration in a web page 130, e.g., on a PC 132 to reflect the current tape library configuration state, including configuration changes when and as they occur. A single HTML source file 134 is provided, updated and maintained for the navigation frame. Each data storage subsystem or data library includes its own library manger 116, tape configuration database 124 and tape management system database 126. A navigation state record 142, e.g., a 32-bit integer value, includes a currency count that is maintained to indicate the most current configuration. Each time any navigation information changes, i.e., from the configuration changing, the currency count is changed, e.g., incremented. The web page display 130 also includes a snapshot of the currency count value, e.g., in a very small frame 144, such as the title frame that includes the title of the working page and may or may not be displayed. The currency count snapshot is the navigation state record value that was provided with the last page request. A navigation frame 146 controls opening and closing different top-level navigation items in the web page display 130 and compares the incoming value in the new title frame to the snapshot value currently stored in the navigation frame.

Figure 3:
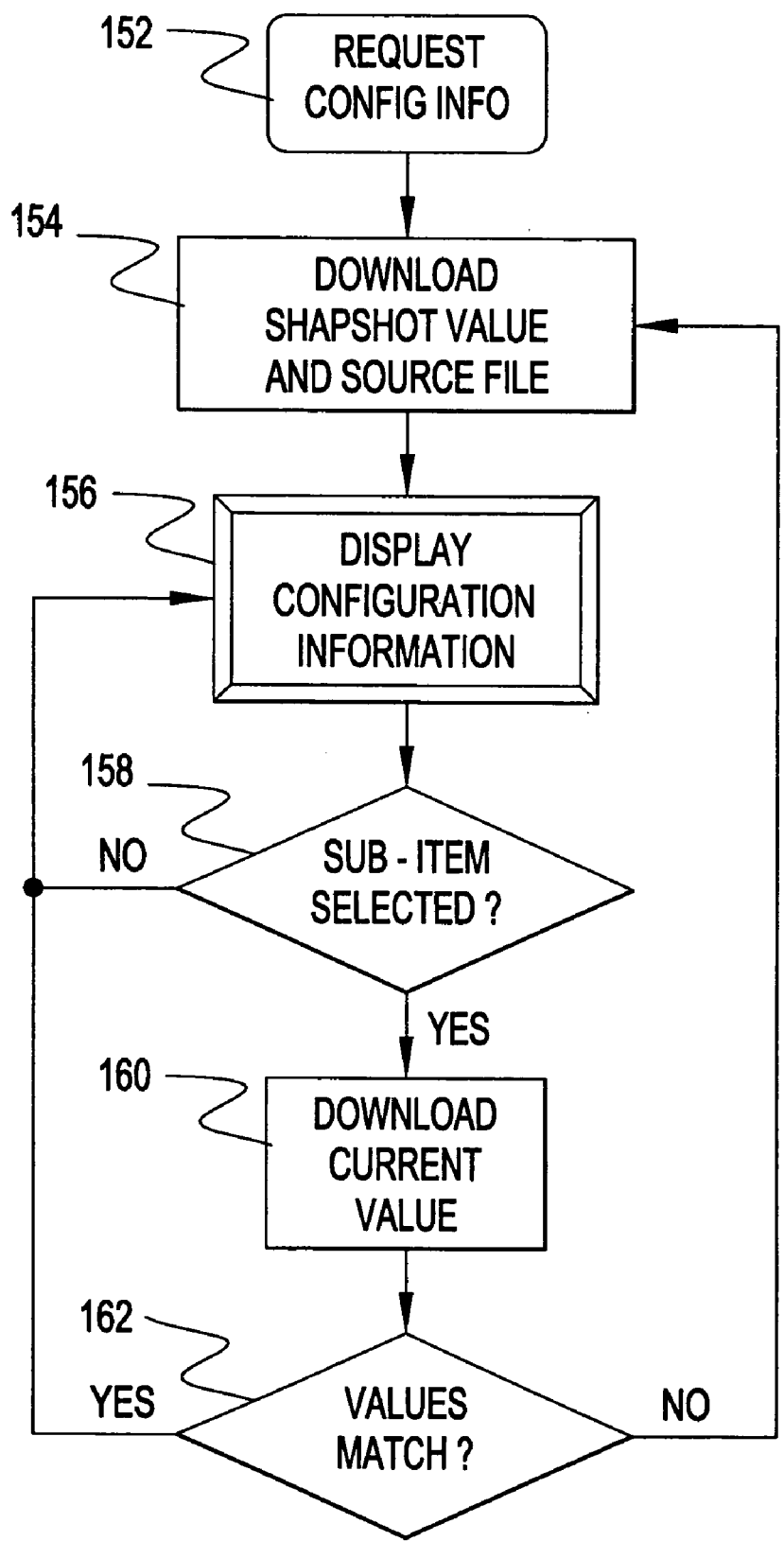
FIG. 3 shows a flow chart example of how updated configuration information is displayed according to a preferred embodiment of the present invention.

FIG. 3 shows a flow chart example 150 of how updated configuration information is displayed according to a preferred embodiment of the present invention with reference to the subsystem example 100 of FIG. 1 and web-based monitoring and management interface example 122 of FIG. 2. First in step 152, the configuration information is requested, e.g., entering a local uniform resource locator (URL) in a web browser. In step 154 the HTML document 134 and navigation state current value 142 (i.e., a snapshot is taken of the value) are downloaded to the client system and displayed in step 156 as a web page 130. The web page 130 continues to display unchanged, as long as, a new page is not requested in step 158. Upon each page request in step 158, e.g., by selection of a link from top level frame 146, the web server sends the current value of the state record 142 to the requesting client in step 160 with the rest of the information for the requested page. In step 162 the requesting client compares the navigation state record 142 current value with the previously provided snapshot value, i.e., the value sent with the currently-displayed navigation frame at the requesting client. If the values match, the HTML document 134 is unchanged from the last download and, returning to step 156 the configuration continues being displayed. Otherwise, if the values do not match, returning to step 154 the client downloads a fresh copy of the HTML document 134 and, so, refreshes the navigation frame.

Thus, each time a new page is loaded into the working, or content area of the client display in step 154, instead of the entire HTML document 134, only a very small frame that includes the title of the working page and the navigation state record 142 is loaded with the new page. Executable code, preferably in JavaScript, for comparing the navigation state record 142 value against the stored value is included in the HTML for the current frame (also in JavaScript). The navigation frame 146 controls opening and closing different top-level navigation items and compares the incoming value in the new title frame to the snapshot value currently stored in the navigation frame. Whenever the values are not the same, the executable code triggers a request from the client browser for a fresh download of the HTML document.

Preferably, upon a refresh request, a snapshot of the current open/closed state of the displayed navigation and upon completion of the refresh the newly-loaded navigation frame returns to the prior state as determined by the snapshot. This avoids the disruption experienced as a result of normal tendency of JavaScript to reset, which would result in displaying only collapsed top-level navigation items each time the navigation page is refreshed and so, losing one's place. Instead, users experience a more seamless and natural navigation, with the page remaining in its intended state, e.g., even if a sub-item listed beneath the third top-level item is being selected causes a refresh; the third top-level item still open in this example, with each of its available sub-items displayed after the refresh.

Advantageously, a preferred embodiment web-based monitoring and management interface keeps displayed configuration up-to-date without undue delays from reloading a new HTML document each time a different web page is selected and while avoiding transcription errors from propagating data through multiple files.

While the invention has been described in terms of preferred embodiments, those skilled in the art will recognize that the invention can be practiced with modification within the spirit and scope of the appended claims.

What is claimed is:

1. A web-based management interface for providing up-to-date up to date system configuration, said web-based management interface comprising:
   means for generating a web displayable file for representing system configuration;
   means for indicating a current generation of said web displayable file;
   means for indicating a generation of a displayed said web displayable file;
   means for comparing said current generation with said generation of said displayed web displayable file; and
   means for selectively providing an updated said web displayable file selected responsive to an indication from said means for comparing that said displayed web displayable file does not match the current generation of said web displayable file.

2. A web-based management interface as in claim 1, wherein said web displayable file is a hypertext mark up language (HTML) file.

3. A web-based management interface as in claim 2, wherein said means for indicating said current generation comprises means for incrementing a currency count.

4. A web-based management interface as in claim 3, wherein said means for indicating said generation for said displayed HTML file comprises a snapshot value of said currency count.

5. A web-based management interface as in claim 4, wherein said snapshot value is contained in a title frame of said displayed HTML file.

6. A web-based management interface as in claim 2, wherein said means for comparing resides in said displayed HTML file.

7. A web-based management interface as in claim 2, wherein said means for providing said updated HTML file comprises means for requesting said HTML from said means for generating said HTML file responsive to said means for comparing indicating that said displayed HTML file does not match the current generation of said HTML file.

8. A web-based management interface as in claim 7, wherein said means for requesting resides in a navigation frame in said displayed HTML file.

9. A web-based management interface as in claim 2, further comprising means for receiving configuration data describing a storage subsystem configuration, said displayed HTML file displaying selected information for said storage subsystem configuration.

10. A computer program product for displaying system configuration information, said computer program product comprising a computer usable medium having computer readable program code thereon, said computer readable program code comprising:
    computer readable program code means for generating a web displayable file responsive to configuration data describing a storage subsystem configuration;
    computer readable program code means for indicating a current generation of said web displayable file;
    computer readable program code means for providing a generation snapshot of said web displayable file;
    computer readable program code means for comparing said current generation with said generation snapshot; and
    computer readable program code means for selectively requesting an updated said web displayable file selected responsive to a comparison indicating that said generation snapshot does not match the current generation, wherein displayed said system configuration information is automatically kept up to date.

11. A computer program product as in claim 10, wherein said web displayable file is a hypertext mark up language (HTML) file and both said computer readable program code means for comparing and said computer readable program code means for selectively requesting are included in said HTML file.

12. A computer program product as in claim 11, wherein said program product means for indicating said current generation comprises means for incrementing a currency count.

13. A computer program product as in claim 12, wherein said generation snapshot is included in a title frame of said HTML file.

14. A computer program product as in claim 13, wherein said configuration data describes a configuration of a storage subsystem, said displayed HTML file displaying selected configuration information for said storage subsystem.

15. A method of providing storage subsystem configuration information comprising the steps of:
    a) displaying a web page indicating storage subsystem configuration, said web page including a generation snapshot indicating a navigation state record value;
    b) providing a currency count value indicating a most current said storage subsystem configuration responsive to selection of a sub-item from the displayed said web page;

c) comparing said generation snapshot with said currency count value, a match indicating that said displayed web page is a most current said web page; and d) returning to step (b) until said comparing step (c) does not indicate a match.

16. A method as in claim 15, wherein said web page is displayed from a hypertext mark up language (HTML) file and whenever said comparing step (c) does not indicate a match, said method further comprising the steps of:

e) providing a current said HTML file, said web page being displayed from the provided said HTML file; and f) returning to step (b).

17. A method as in claim 16, wherein the step (e) of providing said current HTML file further comprises requesting said current HTML file responsive to said comparing step (c).

18. A method as in claim 16, wherein said generation snapshot is included in said HTML file in a title frame of web page and each time said web pace is displayed from a new current HTML file, only a frame that includes the title of the working page and the navigation state record is loaded with the new page.

19. A web-based management interface as in claim 9, wherein said means for receiving configuration data receives storage subsystem configuration data from a storage configuration database and a storage system management database.

20. A web-based management interface as in claim 19, wherein said web-based management interface said storage configuration database and said storage system management database are components of a storage system library manager.

* * * * *